US011889002B2

(12) United States Patent
Norrod et al.

(10) Patent No.: US 11,889,002 B2
(45) Date of Patent: Jan. 30, 2024

(54) USE OF PHYSICAL UNCLONABLE FUNCTIONS TO PREVENT COUNTERFEITING OF INDUSTRIAL CONTROL PRODUCTS

(71) Applicant: Rockwell Automation Technologies, Inc., Mayfield Heights, OH (US)

(72) Inventors: Eric A. Norrod, Franklin, NC (US); Jack Michael Visoky, Willoughby, OH (US); MaryamSadat Hashemian, Highland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 191 days.

(21) Appl. No.: 17/482,952

(22) Filed: Sep. 23, 2021

(65) Prior Publication Data
US 2023/0091028 A1    Mar. 23, 2023

(51) Int. Cl.
H04L 9/32    (2006.01)
G05B 19/418    (2006.01)
H04L 9/08    (2006.01)

(52) U.S. Cl.
CPC ........ H04L 9/3278 (2013.01); G05B 19/4185 (2013.01); H04L 9/0825 (2013.01); H04L 9/3263 (2013.01); G05B 2219/24167 (2013.01)

(58) Field of Classification Search
CPC ... H04L 9/3278; H04L 9/0825; H04L 9/3263; H04L 9/3247; G05B 19/4185; G05B 2219/24167
See application file for complete search history.

(56) References Cited

U.S. PATENT DOCUMENTS 5,875,248 A * 2/1999 Lewis .................. G06Q 20/341
                                            713/168
6,769,060 B1 * 7/2004 Dent ..................... H04L 9/0844
                                            713/168
(Continued)

FOREIGN PATENT DOCUMENTS

EP    2191410 B1    10/2014
WO    2684331 A1    9/2012

OTHER PUBLICATIONS

Schrijen, Gert Jan et al., "Secure Devise Management for the Internet of Things", Intrinsic ID, Apr. 1, 2019, pp. 1-10, retrieved from the Internet: URL: https://www.intrinsic-id.com/wp-content/uploads/2019/05/Secure-Device Management-for-the-Internet-of-Things.pdf>.

(Continued)

Primary Examiner — J. Brant Murphy

(57) ABSTRACT

Techniques for authenticating industrial devices in an industrial automation environment are disclosed herein. In at least one implementation, a physical unclonable function response of an industrial device is extracted. The industrial device transmits a security certificate signed by a certificate authority that includes a device public key to a system, wherein the system validates the security certificate, encrypts an authentication challenge using the device public key, and transmits the authentication challenge to the industrial device. The industrial device generates a device private key using the physical unclonable function response and decrypts the authentication challenge using the device private key. The industrial device generates an authentication response based on the authentication challenge, encrypts the authentication response using the device private key, and transmits the authentication response to the system, wherein the system decrypts the authentication response using the (Continued)

device public key and authenticates the industrial device based on the authentication response.

20 Claims, 7 Drawing Sheets

(56) References Cited

U.S. PATENT DOCUMENTS

| | | | | |
|---|---|---|---|---|
| 8,516,269 | B1* | 8/2013 | Hamlet | G06F 21/445 |
| | | | | 713/180 |
| 9,998,445 | B2* | 6/2018 | Wallrabenstein | G09C 1/00 |
| 10,496,811 | B2* | 12/2019 | Gulati | H04L 9/0891 |
| 2010/0211787 | A1* | 8/2010 | Bukshpun | H04L 9/14 |
| | | | | 380/255 |
| 2015/0200920 | A1* | 7/2015 | Norton | H04L 63/0442 |
| | | | | 713/153 |
| 2016/0021096 | A1* | 1/2016 | Wallrabenstein | H04L 63/061 |
| | | | | 713/174 |
| 2018/0097639 | A1* | 4/2018 | Gulati | G06F 8/61 |
| 2019/0334730 | A1* | 10/2019 | Endress | H04L 9/3247 |
| 2020/0112442 | A1* | 4/2020 | Wentz | H04L 9/3297 |
| 2021/0014048 | A1* | 1/2021 | Lee | H04L 9/0838 |
| 2021/0314176 | A1* | 10/2021 | Cambou | H04L 9/0866 |
| 2021/0392004 | A1* | 12/2021 | Kim | H04L 9/3278 |

OTHER PUBLICATIONS

Extended European Search Report issued by the European Patent Office in application No. 22196341.6 dated Jan. 27, 2023, 9 pages.
Ghaeini, Hamid Reza et al, "PAtt: Physics-based Attestation of Control Systems" USENIX Association, 22nd International Symposium on Research in Attacks, Intrusions and Defenses, 16 pages.
Labrado, Carson et al, "Use of Thermistor Temperature Sensors for Cyber-Physical System Security," retrieved from www.mdpi.com/journal/sensors, published Sep. 10, 2019, 16 pages.
Schrijen, Geert-Jan et al, "How to Transform a Tiny Medical Device Into a Secure One in Easy Steps," IoT Security Foundation Conference 2019.
Abmuth, Andreas et al., "Improving Resilience by Deploying Permuted Code onto Physically Unclonable Unique Processors," University of Glasglow, University of Strathclyde, 8 pages.

* cited by examiner

USE OF PHYSICAL UNCLONABLE FUNCTIONS TO PREVENT COUNTERFEITING OF INDUSTRIAL CONTROL PRODUCTS

TECHNICAL FIELD

Aspects of the disclosure are related to computing hardware and software technology, and in particular to industrial automation applications.

TECHNICAL BACKGROUND

Industrial automation environments utilize machines during the industrial manufacturing process, such as drives, pumps, motors, and robots. These machines typically have various moving parts and other components that are driven by instructions received from industrial control systems. Machine builders, solution providers, and other content creators typically produce the control logic needed to run on these controllers to control the machines.

In addition to controller logic, other content may be employed or generated during industrial automation operations, such as data sets, drive parameters, cam tables, product formulations, recipes, production data, and human-machine interface (HMI) components. An HMI receives and processes status data from the machines to generate various graphical displays. For example, an HMI graphical display might indicate status metrics of a drive, the pressure of a pump, the speed of a motor, or the output of a robot. The HMI may also provide a mechanism for an operator to send control instructions to an industrial control system that controls a machine. For example, an operator might use the HMI to direct the control system to update drive parameters, turn on a pump, speed-up a motor, or stop a robot.

OVERVIEW

Techniques for authenticating industrial devices associated with an industrial process in an industrial automation environment are disclosed herein. In at least one implementation, a physical unclonable function response of an industrial device is extracted. In response to receiving a request for a security certificate from a system, the industrial device transmits the security certificate signed by a certificate authority that includes a device public key associated with the industrial device, wherein the system validates the security certificate, encrypts an authentication challenge for the industrial device using the device public key, and transmits the authentication challenge for delivery to the industrial device. In response to receiving the authentication challenge, the industrial device generates a device private key using the physical unclonable function response of the industrial device and decrypts the authentication challenge using the device private key. The industrial device generates an authentication response based on the authentication challenge, encrypts the authentication response using the device private key, and transmits the authentication response for delivery to the system, wherein the system decrypts the authentication response using the device public key and authenticates the industrial device based on the authentication response.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
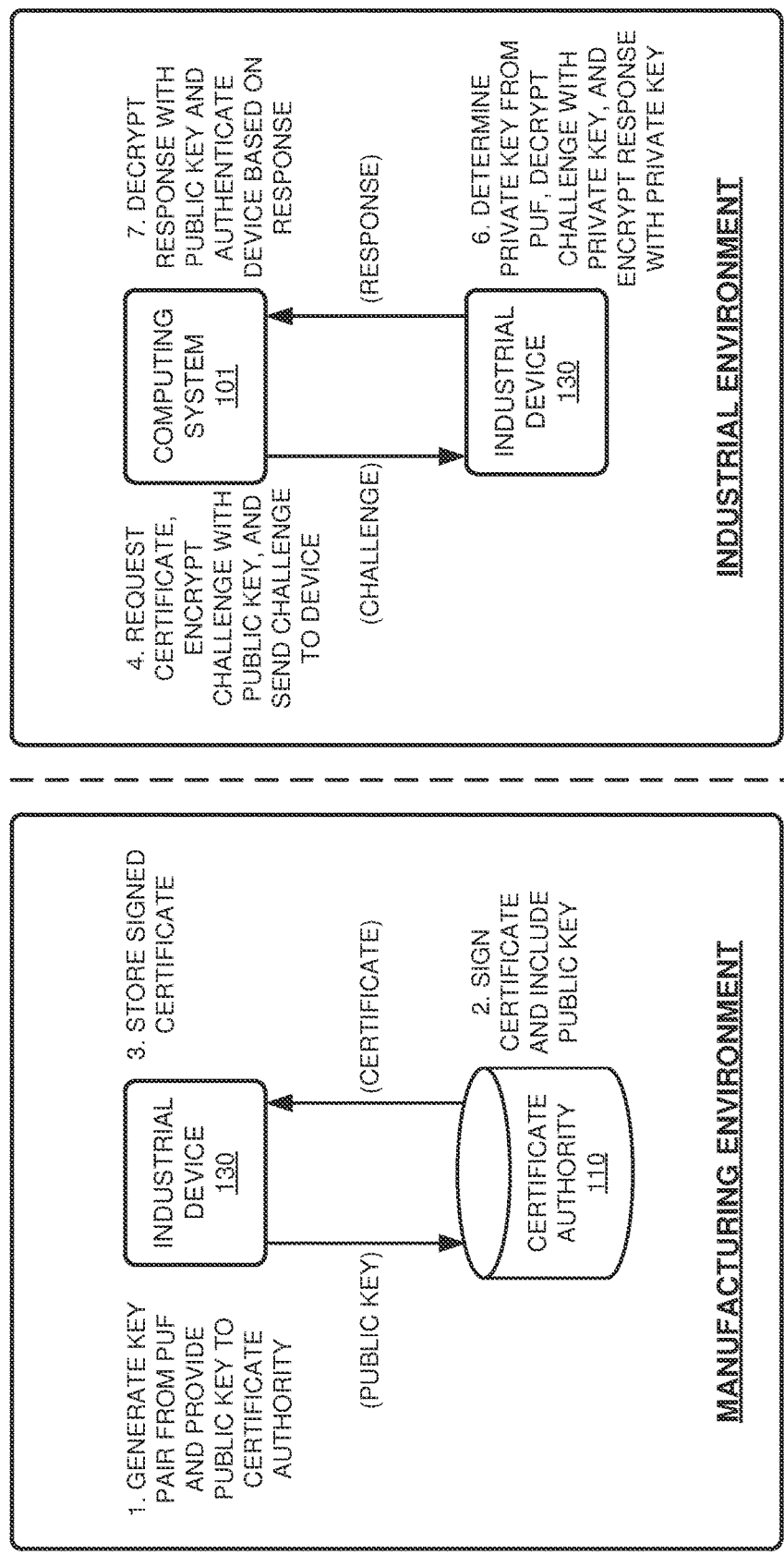
FIG. 1 is a block diagram that illustrates a communication system in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various industrial devices are often employed in industrial automation environments, such as controllers, drives, communication modules, HMI devices, and other industrial equipment. Counterfeit industrial control products are a security vulnerability. An attacker can create a counterfeit device or alter a genuine device to use a microprocessor that runs custom or modified firmware. These fake or modified devices can go undetected, thereby allowing the attacker to compromise the system.

Some authentication solutions depend upon a secret key stored in the device that can possibly be extracted from the device, allowing it to be counterfeited, even when the device includes specialized secure hardware. The techniques described herein utilize secret information that is inherent to the atomic structure of a device that cannot be extracted or modified. Any attempt to measure or extract the data will modify the secret information. Specifically, implementations disclosed herein provide for using a physical unclonable function (PUF) as the basis for a device's unique secret key. PUFs are digital circuits that produce a unique binary value for each instance of a semiconductor device, such as a microprocessor. It is impractical to extract this secret PUF response value. The PUF response signature is derived from the atomic structure of the silicon. Probing of the silicon will modify the secret value. Thus, a PUF signature is essentially equivalent to a digital fingerprint. From this digital fingerprint an asymmetric key pair may be created. The public portion of the key pair may then be included in an identity certificate that is signed by the root of trust of the original equipment manufacturer (OEM). Cryptographic verification of the certificate's signature followed by a zero-knowledge proof using the public key may be used to demonstrate that the device was in fact manufactured by the OEM.

Implementations disclosed herein provide for authenticating industrial devices associated with an industrial process in an industrial automation environment. In at least one implementation, authenticity verification of an industrial device is achieved by extracting a PUF response or signature from the industrial device in order to generate a unique key pair based on the secret PUF data. Once the unique key pair for the industrial device is generated from the PUF response, a digital security certificate may be created and signed by a certificate authority of the OEM. This digital certificate contains product identity information including the unique public key of the device that was generated from the PUF response. A cryptographically secure hash may be computed using the information in the certificate. This hash value is then encrypted using the OEM's private key and attached to the certificate. This certificate is made available to the public. To verify the authenticity of the device, the certificate's digital signature is verified using the OEM's public key. Once the certificate's authenticity is established, the device's authenticity is verified using the unique public key of the device contained in the certificate. A device challenge value is created by encrypting a random number with the public key in the certificate. This encrypted value is then communicated to the device. The industrial device decrypts the value with its secret key that was generated from the PUF response and increments the value by one. The device then re-encrypts the new value with its secret key as the result of the challenge. The challenger then decrypts the response with the device's public key obtained from the authenticated certificate. If the value is the original random number plus one, then the challenger knows that the product is authentic. In this manner, industrial control products and other industrial devices can be authenticated without risking actually storing the unique private encryption key on the device, thereby providing more robust security and resistance to counterfeiting.

Figure 2:
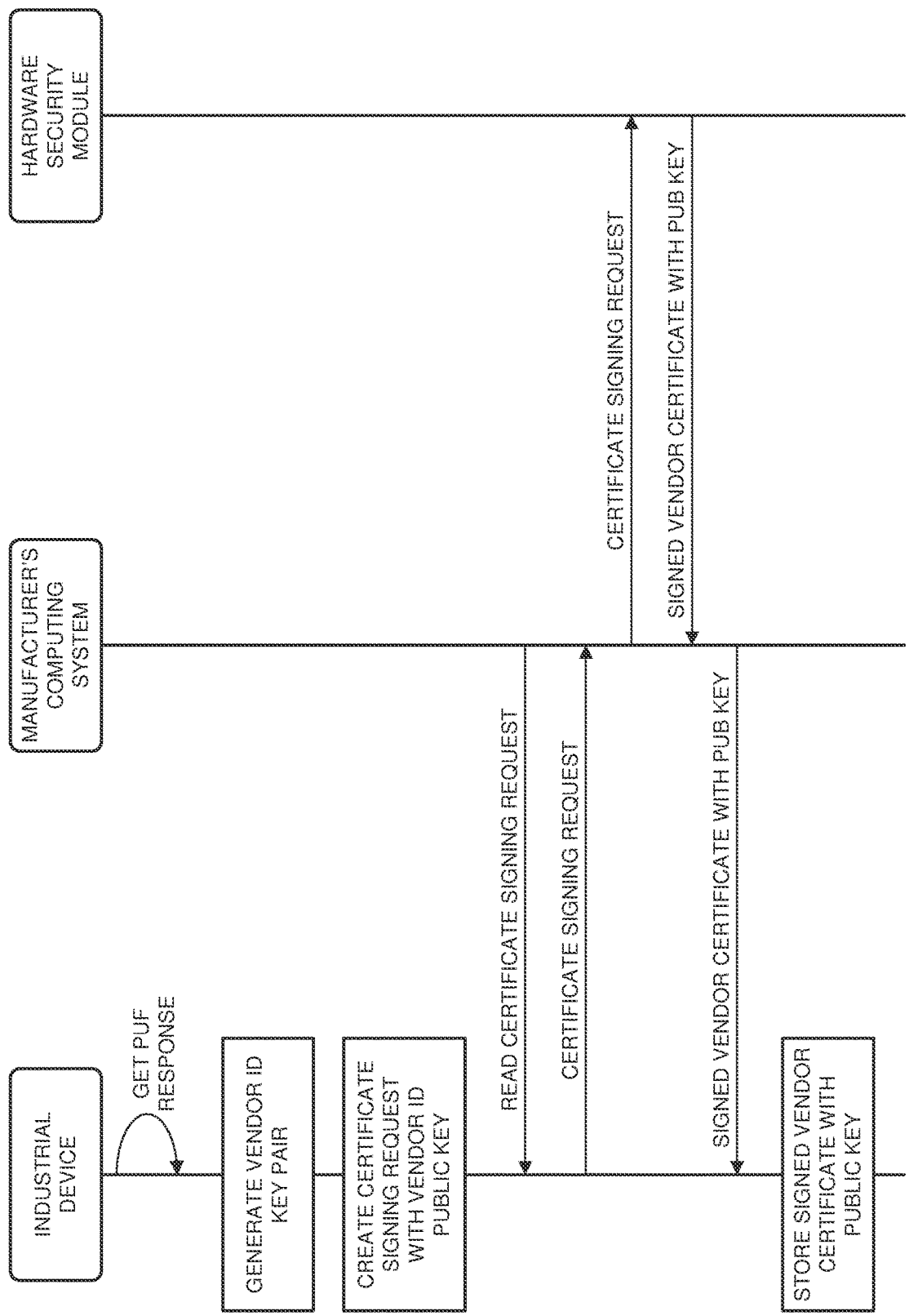
FIG. 2 is a sequence diagram that illustrates an operation to provision a certificate for an industrial device in an exemplary implementation.
Figure 3:
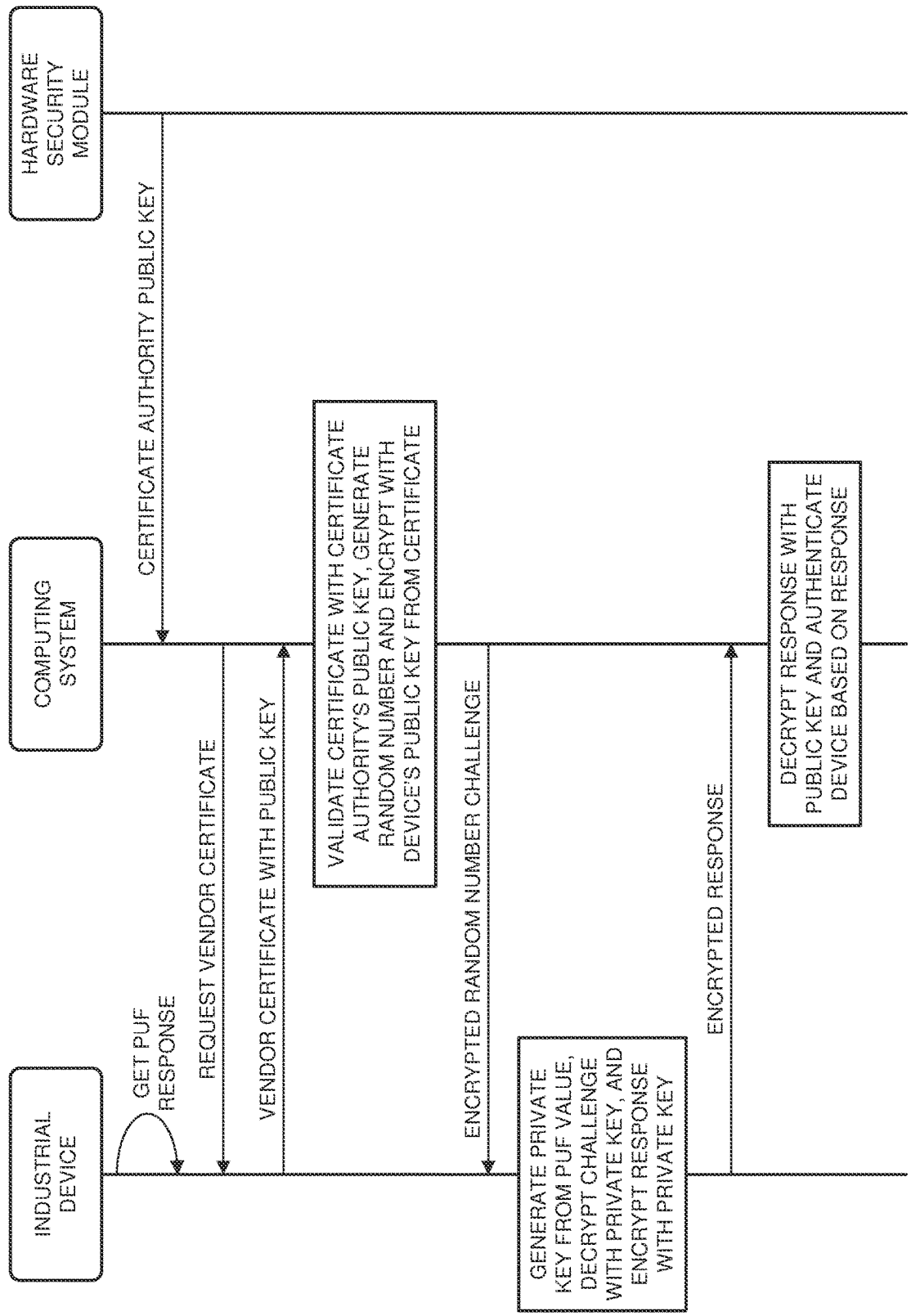
FIG. 3 is a sequence diagram that illustrates an operation to authenticate an industrial device in an exemplary implementation.
Figure 4:
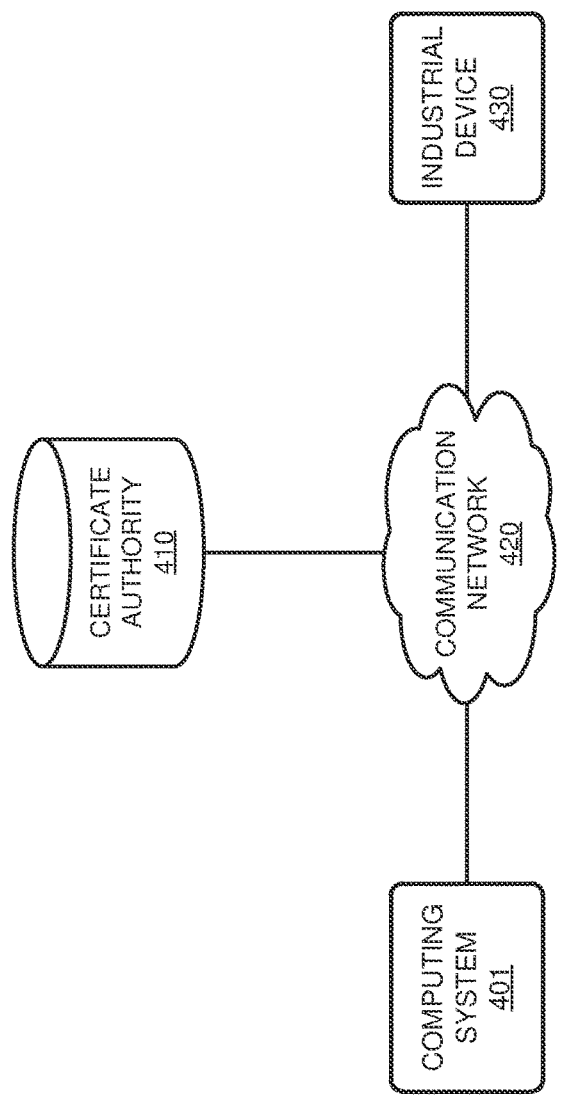
FIG. 4 is a block diagram that illustrates a communication system in an exemplary implementation.
Figure 5:
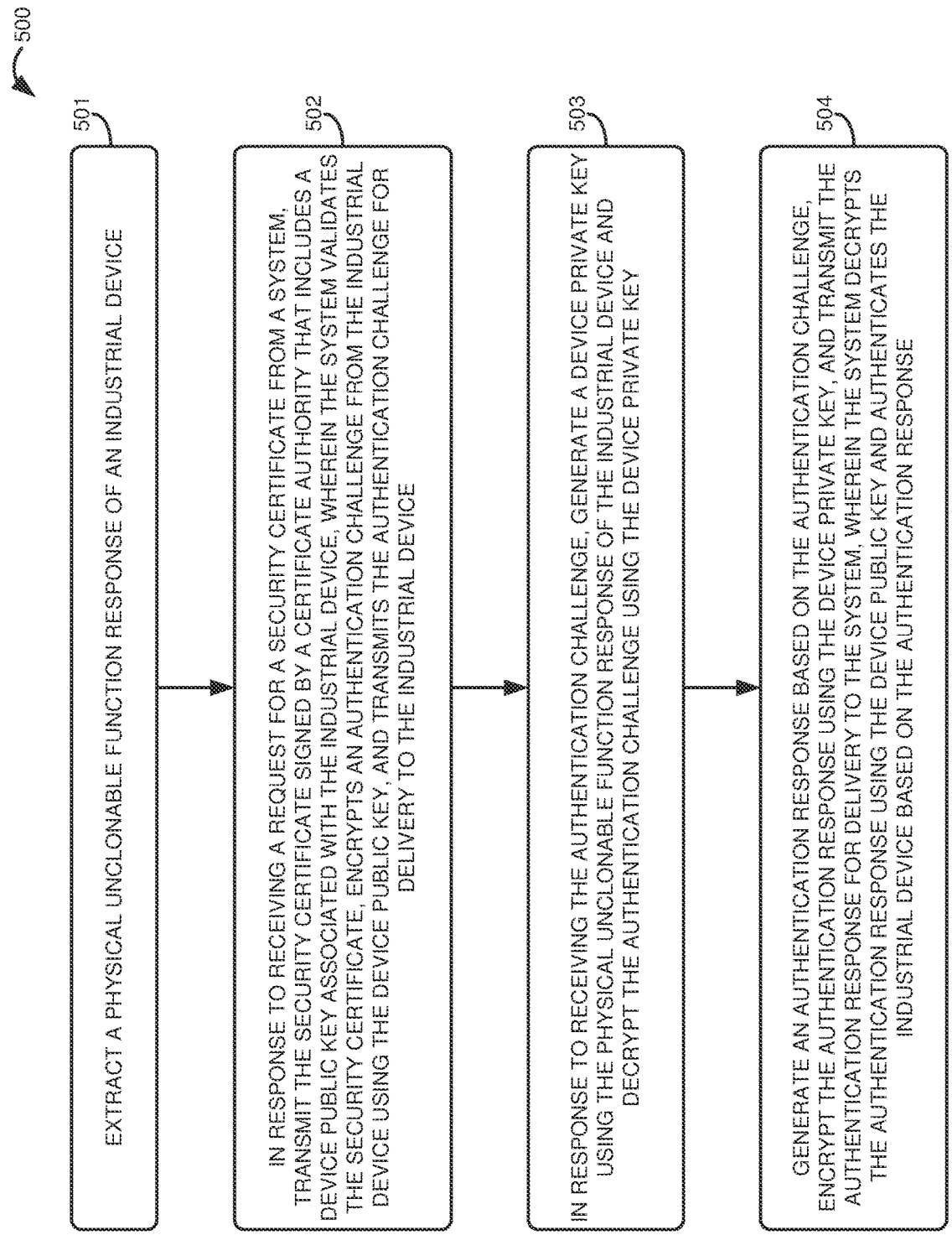
FIG. 5 is a flow diagram that illustrates an operation of a communication system in an exemplary implementation.
Figure 6:
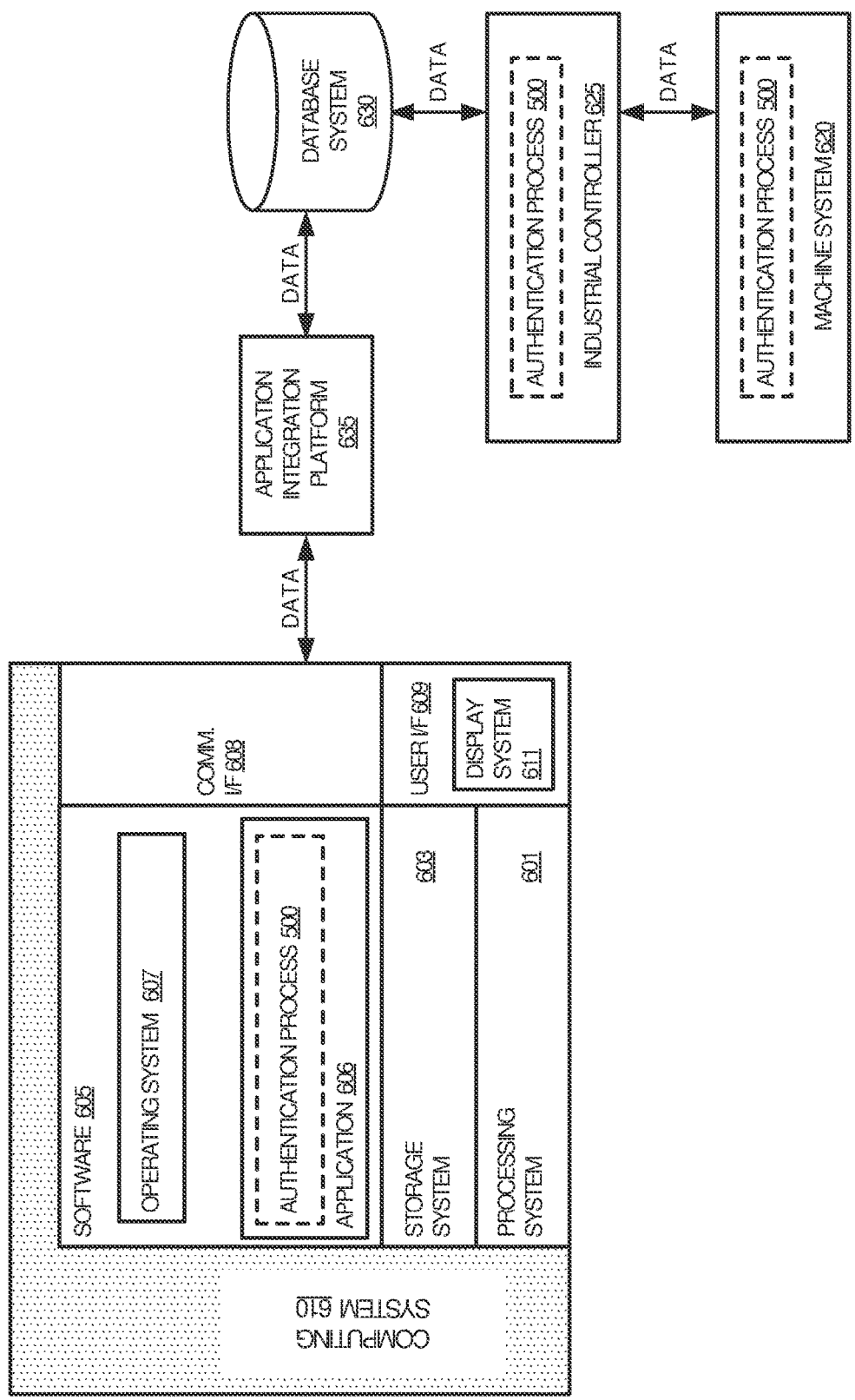
FIG. 6 is a block diagram that illustrates an operational scenario involving a computing system in an industrial automation environment in an exemplary implementation.
Figure 7:
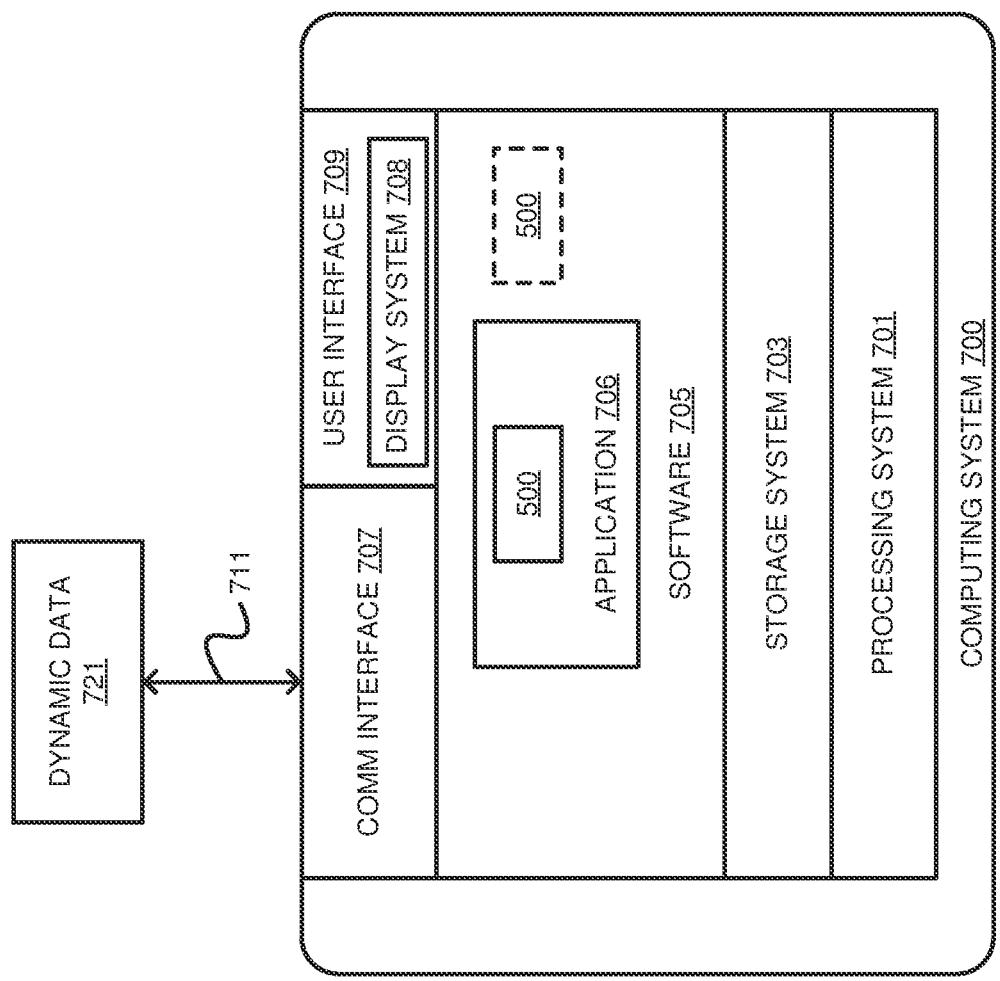
FIG. 7 is a block diagram that illustrates a computing system in an exemplary implementation.

Referring now to the drawings, FIG. 1 illustrates an exemplary communication system, and FIG. 2 illustrates a sequence diagram of an operation to provision a digital security certificate for an industrial device in an exemplary implementation. FIG. 3 is a sequence diagram that illustrates an operation to authenticate an industrial device in an exemplary implementation. FIG. 4 illustrates another exemplary communication system, and FIG. 5 illustrates a flow diagram of an operation for authenticating industrial devices associated with an industrial process in an industrial automation environment in an exemplary implementation. FIG. 6 illustrates an exemplary industrial automation environment that includes a computing system that may be used to execute an authentication process or portions thereof, and FIG. 7 illustrates an exemplary computing system that may be used to perform any of the authentication processes and operational scenarios described herein.

Turning now to FIG. 1, a block diagram that illustrates communication system 100 in an exemplary implementation is shown. Communication system 100 includes a manufacturing environment and an industrial environment. The manufacturing environment includes certificate authority 110 and industrial device 130, and the industrial environment includes the same industrial device 130 and a computing system 101. In some examples, the industrial environment of communication system 100 could comprise an industrial automation environment, such as an automobile manufacturing factory, food processing plant, oil drilling operation, microprocessor fabrication facility, or some other type of industrial enterprise. Industrial device 130 could comprise industrial controllers, overload protectors, motion drives, motors, energy monitoring equipment, input/output (I/O) modules, lighting controls, motion controls, motor controls, operator interfaces, power supplies, push buttons and signaling devices, safety products, communication devices, sensors, switches, data transmitters, HMI hardware systems, and any other industrial automation equipment. In some examples, where industrial device 130 comprises an industrial controller, industrial device 130 could comprise an automation control system that drives the operation of industrial machinery, such as a programmable logic controller (PLC), programmable automation controller (PAC), or any other controller used in automation control. In some examples, industrial device 130 could comprise a ControlLogix® control system provided by Rockwell Automation, Inc.

Communication system 100 provides an example of a communication system in which any of the authentication processes and operational scenarios described herein may be implemented. The techniques described below with respect to FIG. 1 could be executed by the systems of communication system 100 such as computing system 101, certificate authority 110, and industrial device 130, and could be combined with operation 500 of FIG. 5 in some implementations.

In operation, industrial device 130 generates a public and private encryption key pair by first extracting a PUF response or signature from device 130. For example, upon powering up for the first time, industrial device 130 may be configured to extract the PUF response from static random-access memory (SRAM) or some other memory component of industrial device 130, which provides a unique fingerprint or signature of the silicon of the SRAM. However, note that in some implementations, the PUF response signature could be extracted from any physical unclonable function, including ring oscillators, semiconductor devices such as microprocessors, or any other integrated circuitry. In at least one implementation, industrial device 130 may utilize error correcting code to correct any transistors in the SRAM that boot up with random states in order to ensure that the PUF response is consistent on every subsequent power up. The unique silicon fingerprint provided by the PUF response is then used to generate the unique encryption key pair. The private key of industrial device 130 provides a unique identity of device 130 in that the private key is specifically associated with industrial device 130 and no other industrial device. However, because industrial device 130 can always generate the private key by extracting the unique PUF response or signature from its own hardware, the actual private encryption key does not need to be stored in device 130 or persisted in non-volatile memory, which reduces the risk of backdoor attacks on cryptographic systems. The public key of this key pair is then provided to certificate authority 110, as illustrated in the manufacturing environment of FIG. 1.

Once certificate authority 110 receives the public key, certificate authority 110 creates a security certificate for industrial device 130 that includes the public key of device 130. Certificate authority 110 signs the security certificate using its own private encryption key in order to prove that the public key included within the certificate is authentic. Certificate authority 110 then sends the signed certificate containing the public key of device 130 back to industrial device 130, which stores the signed certificate in non-volatile memory. The security certificate provides strong identity information for industrial device 130, including the device type, and uniquely identifies the specific industrial device 130 of that device type, such as a serial number or other identifying information. The security certificate is signed by certificate authority 110 using its private key so that the security certificate can later be validated and verified as authentic by any system that has the corresponding public key of certificate authority 110.

After industrial device 130 generates the public key pair based on the extracted PUF response in order to establish a unique identity and then provisioned with the security certificate signed by certificate authority 110, device 130 may be sold to and operated by an industrial enterprise, as illustrated in the industrial environment of FIG. 1. In general, an industrial automation environment requires establishing secure communications between trusted devices. Accordingly, when industrial device 130 is connected to the plant network and goes online, device 130 will need to be authenticated to ensure that it is genuine and allowed to communicate on the network. In this example, computing system 101 is functioning to authenticate industrial device 130. Initially, as indicated in step 4, computing system 101 requests the security certificate from industrial device 101. Computing system 101 can then verify that the public key contained in the certificate is authentic by validating the certificate using the public key of certificate authority 110, which is made publically available by certificate authority 110. Once the certificate is validated and the public key of device 130 is obtained, computing system 101 encrypts an authentication challenge for industrial device 130 using the public key of device 130. In some implementations, the authentication challenge could comprise a random number. Computing system 101 then sends the authentication challenge to industrial device 130.

In order to decrypt the authentication challenge, industrial device 130 needs to determine its private key, which is possible by generating the private key from the PUF response. In some implementations, industrial device 130 may extract the PUF response or signature upon every boot up and store the PUF response in volatile memory, so that the PUF response may then be used to re-generate the private key as needed. In at least one implementation, industrial device 130 stores the PUF response securely by instructing a memory management unit (MMU) to direct the processor on boot up that a particular area of memory where the PUF response is stored needs to be protected, and if that area of memory is ever attempted to be accessed by anything other than privileged code, then a fault will occur which will reset the processor and cause the memory to be erased so that the PUF response is destroyed. In this example, industrial device 130 accesses the secure memory area where the PUF response is stored and re-generates the private key using the PUF response value. Industrial device 130 then uses the private key to decrypt the authentication challenge and generates an authentication response. For example, if the authentication challenge comprises a random number, industrial device 130 may increment the random number by one, or perform some other predetermined mathematical operation on the random number in order to generate the authentication response. Industrial device 130 then encrypts the authentication response using the private key, and sends the encrypted response back to computing system 101.

Upon receipt of the authentication response, computing system 101 decrypts the response using the public key of industrial device 130 obtained from the security certificate, and is able to authenticate device 130 based on the response. For example, if the random number is modified in a predetermined and agreed-upon manner, such as incrementing the number by one, then computing system 101 can be confident that industrial device 130 is authentic. In this manner, industrial device 130 can be authenticated without having to store the unique private encryption key in non-volatile memory of device 130.

Beneficially, by extracting and utilizing a PUF response value, industrial device 130 is able to dynamically re-generate the private encryption key needed to decrypt authentication challenges, licensing information, or any other data encrypted with the device's corresponding public key. By utilizing inherent characteristics of the hardware through PUF response signature extraction, identity-based secrets may be securely stored within industrial device 130. These secrets enable strong cryptographic identity through the use of a vendor-signed certificate and backing certificate authority 110. In this manner, genuine hardware is more readily authenticated and better protected from counterfeiting. Another exemplary operation to provision a digital security certificate for an industrial device will now be discussed with respect to the sequence diagram of FIG. 2.

FIG. 2 illustrates a sequence diagram of an operation to provision a digital security certificate for an industrial device in an exemplary implementation. The techniques described below with respect to FIG. 2 could be executed by the systems of communication system 100 such as computing system 101, certificate authority 110, and industrial device 130, and could be combined with operation 500 of FIG. 5 in some implementations.

Initially, in this example the industrial device extracts a PUF response value from SRAM or some other memory component of the device, which provides a unique fingerprint of the memory silicon. For example, the manufacturer of the industrial device may power up the device for the first time, and the device may be configured to extract the PUF response value from the SRAM, cache, or some other memory component, which provides a unique fingerprint of the memory. However, note that in some implementations, the PUF response signature could be extracted from any physical unclonable function, including ring oscillators, semiconductor devices such as microprocessors, or any other integrated circuitry. In at least one implementation, error correcting code may be used to correct any transistors that boot up with random states in order to ensure that the PUF response is consistent on every subsequent power up. The unique PUF response signature is then used to generate a unique vendor identification (VID) encryption key pair. The private key provides a unique identity of the industrial device in that the private key is specifically associated with the industrial device and no other device.

The industrial device then creates a certificate signing request for transmission to a hardware security module. The VID public key of the key pair generated from the PUF response value is included in the certificate signing request created by the industrial device. A manufacturer's computing system reads and receives the certificate signing request and forwards the certificate signing request to a hardware security module. The hardware security module receives the certificate signing request and creates a vendor certificate having the VID public key and signs the vendor certificate using its own private encryption key. The hardware security module then sends the signed vendor certificate containing the VID public key of the industrial device back to the industrial device via the manufacturer's computing system. The industrial device then stores the signed vendor certificate with the VID public key in non-volatile memory. The security certificate is signed by the hardware security module using its private key so that the security certificate can later be validated and verified as authentic by any system that has the corresponding public key, which is generally made publically available. In this manner, the industrial device is provisioned with a security certificate and verifiable public key that pairs with the private key that the device can re-generate at will using the PUF response value extracted at boot up. An exemplary operation to authenticate this industrial device will now be discussed with respect to the sequence diagram of FIG. 3.

FIG. 3 illustrates a sequence diagram of an operation to authenticate an industrial device in an exemplary implementation. The techniques described below with respect to FIG. 3 could be executed by the systems of communication system 100 such as computing system 101, certificate authority 110, and industrial device 130, and could be combined with operation 500 of FIG. 5 in some implementations.

In this example, the computing system is attempting to authenticate the industrial device, which has been provisioned with a vendor certificate as discussed above with respect to FIG. 2. In this example, the computing system is shown as initially receiving the certificate authority public key from the hardware security module for simplicity, but the computing system may obtain the public key of the certificate authority from anywhere that the public key is made publically available. In addition, the industrial device is shown as initially obtaining the PUF response value. In this example, the industrial device is configured to extract the PUF response signature upon every boot up and then store the PUF signature in volatile memory, so that the PUF signature may then be used to re-generate the private key as needed.

In order to authenticate the industrial device, the computing system requests the vendor certificate from the device. The industrial device provides the signed vendor certificate to the computing system in response to the request. The vendor certificate contains the public key associated with the key pair that may be generated by the PUF response value of the industrial device. The computing system validates the vendor certificate with the certificate authority's public key, since the certificate was signed by the certificate authority's private key when the vendor certificate was initially provisioned to the industrial device as discussed above with respect to FIG. 2. Upon successful validation, the computing system retrieves the public key of the industrial device from the certificate, generates a random number challenge, and encrypts the random number challenge with the device's public key from the certificate.

The industrial device then receives the encrypted random number challenge from the computing system. In order to decrypt the random number challenge, the industrial device needs to determine its private key, which is possible by generating the private key from the PUF response signature. In this example, the industrial device accesses the volatile memory area where the PUF response signature is stored and re-generates the private key using the PUF response signature. The industrial device then uses the private key to decrypt the random number challenge and generates a response, such as incrementing the random number by one. The industrial device then encrypts the response using the private key, and sends the encrypted response back to the computing system.

Upon receipt of the response, computing system 101 decrypts the response using the public key of the industrial device obtained from the vendor certificate, and is able to authenticate the industrial device based on the response. In this manner, the industrial device can be authenticated without having to persist the unique private encryption key in non-volatile memory of the device, which would pose a security risk and increase the ability to produce counterfeits of the industrial device. Another exemplary industrial automation environment that may be utilized to implement the authentication processes and operational scenarios described herein will now be discussed with respect to FIG. 4.

FIG. 4 is a block diagram that illustrates communication system 400 in an exemplary implementation. Communication system 400 provides an example of a communication system in which any of the authentication processes and operational scenarios described herein may be implemented. The techniques described below with respect to FIG. 4 could also be executed by the systems of communication system 100 such as computing system 101, certificate authority 110, and industrial device 130, and could be combined with the operations of FIGS. 2 and 3 in some implementations.

Communication system 400 includes computing system 401, certificate authority 410, communication network 420, and industrial device 430. In some examples, industrial device 430 could be deployed for operation in an industrial automation environment, such as an automobile manufacturing factory, food processing plant, oil drilling operation, microprocessor fabrication facility, or some other type of industrial enterprise. For example, industrial device 430 could comprise industrial controllers, overload protectors, motion drives, motors, energy monitoring equipment, input/output (I/O) modules, lighting controls, motion controls, motor controls, operator interfaces, power supplies, push buttons and signaling devices, safety products, communication devices, sensors, switches, data transmitters, HMI hardware systems, and any other industrial automation equipment. In some examples, where industrial device 430 comprises an industrial controller, industrial device 430 could comprise an automation control system that drives the operation of industrial machinery, such as a PLC, PAC, or any other controller used in automation control. In some examples, industrial device 430 could comprise a ControlLogix® control system provided by Rockwell Automation, Inc. An exemplary operation of communication system 400 for authenticating industrial devices associated with an industrial process in an industrial automation environment will now be discussed with respect to FIG. 5.

FIG. 5 is a flow diagram that illustrates an operation 500 of a communication system in an exemplary implementation. The operation 500 shown in FIG. 5 may also be referred to as authentication process 500 herein. The steps of the operation are indicated below parenthetically. The following discussion of operation 500 will proceed with reference to computing system 401, certificate authority 410, and industrial device 430 of FIG. 4 in order to illustrate its operations, but note that the details provided in FIG. 4 are merely exemplary and not intended to limit the scope of process 500 to the specific implementation shown in FIG. 4.

Operation 500 may be employed for authenticating industrial devices associated with an industrial process in an industrial automation environment. As shown in the operational flow of process 500, industrial device 430 extracts a physical unclonable function response of industrial device 430 (501). In some implementations, industrial device 430 could be configured to extract the physical unclonable function response from static random-access memory (SRAM), processor cache, or some other memory component of industrial device 430, which provides a unique fingerprint of the memory. For example, in at least one implementation, the physical unclonable function response could comprise an SRAM-based physical unclonable function response. However, note that in some implementations, the physical unclonable function response signature could be extracted from any physical unclonable function, including ring oscillators, semiconductor devices such as microprocessors, or any other integrated circuitry. In at least one implementation, industrial device 430 may utilize error correcting code to correct any transistors in the memory that boot up with random states in order to ensure that the physical unclonable function response is consistent on every subsequent power up. In at least one implementation, industrial device 430 may extract the physical unclonable function response upon every boot up and store the physical unclonable function response signature in volatile memory. For example, in some implementations, industrial device 430 extracting the physical unclonable function response of industrial device 430 could comprise industrial device 430 storing the physical unclonable function response in a secure portion of volatile memory of industrial device 430 that is reserved for access by privileged code. In this case, industrial device 430 may store the physical unclonable function response securely by instructing a memory management unit to direct the processor on boot up that a particular portion of volatile memory reserved for storing the physical unclonable function response needs to be protected, and if anything other than privileged code ever attempts to access that protected portion of memory, then a fault will occur which will reset the processor and cause at least the protected portion of the memory to be erased so that the physical unclonable function response value is destroyed.

In response to receiving a request for a security certificate from computing system 401, industrial device 430 transmits the security certificate signed by a certificate authority that includes a device public key associated with industrial device 430, wherein computing system 401 validates the security certificate, encrypts an authentication challenge for industrial device 430 using the device public key, and transmits the authentication challenge for delivery to industrial device 430 (502). Computing system 401 generally requests the security certificate from industrial device 430 for use in authenticating device 430. In some implementations, industrial device 430 is initially provisioned with the security certificate that includes the device public key that is paired with a device private key that may be generated by industrial device 430 using the physical unclonable function response. For example, in at least one implementation, a manufacturer of industrial device 430 may power up device 430 for the first time as part of the manufacturing process, and industrial device 430 may be configured to extract the physical unclonable function response upon initial power up for use in generating a unique encryption key pair. The private key provides a unique identity of industrial device 430 in that the private key is specifically associated with industrial device 430 and no other device. The corresponding public key associated with industrial device 430 may then be provided to certificate authority 410 for generating the security certificate. Once certificate authority 410 receives the public key associated with industrial device 430, certificate authority 410 may create the security certificate for industrial device 430 that includes the public key of device 430. Certificate authority 410 may then sign the security certificate using its own private encryption key in order to prove that the public key of device 430 included within the certificate is authentic. Certificate authority 410 may then send the signed certificate containing the public key of device 430 back to industrial device 430, which may store the signed certificate in non-volatile memory.

In some implementations, the security certificate is signed by certificate authority 410 using an authority private key associated with certificate authority 410, and computing system 401 validates the security certificate using an authority public key paired with the authority private key associated with certificate authority 410, and extracts the device public key from the security certificate upon successfully validating the security certificate. For example, computing system 401 can verify that the public key contained in the security certificate is authentic by validating the certificate using the authority public key of certificate authority 410, which may be made publically available by certificate authority 410 in some implementations. Once the security certificate is validated and the device public key of industrial device 430 is obtained, computing system 401 may encrypt an authentication challenge for industrial device 430 using the device public key. In some implementations, the authentication challenge could comprise a random number or any other secret value known to computing system 401. Computing system 401 then transmits the authentication challenge for delivery to industrial device 430.

In response to receiving the authentication challenge, industrial device 430 generates a device private key using the physical unclonable function response of industrial device 430 and decrypts the authentication challenge using the device private key (503). In order to decrypt the authentication challenge, industrial device 430 needs to obtain the device private key, which is possible by generating the device private key from the physical unclonable function response of industrial device 430. In at least one implementation, industrial device 430 may generate the device private key using the physical unclonable function response by generating the device private key using a static random-access memory-based physical unclonable function response. In some implementations, industrial device 430 may extract the physical unclonable function response upon every boot up and store the physical unclonable function response in volatile memory, so that the physical unclonable function response signature may then be used to re-generate the private key as needed. In this case, industrial device 430 may access the protected portion of memory where the physical unclonable function response is stored and re-generate the private key using the physical unclonable function response value. Industrial device 430 may then use the device private key to decrypt the authentication challenge received from computing system 401.

Industrial device 430 generates an authentication response based on the authentication challenge, encrypts the authentication response using the device private key, and transmits the authentication response for delivery to computing system 401, wherein computing system 401 decrypts the authentication response using the device public key and authenticates industrial device 430 based on the authentication response (504). In at least one implementation, the authentication challenge for industrial device 430 may comprise a random number, and industrial device 430 could generate the authentication response based on the authentication challenge by processing the random number of the authentication challenge using a predetermined mathematical function to generate the authentication response. For example, the predetermined mathematical function could comprise incrementing the random number by one, such that industrial device 430 processing the random number of the authentication challenge using the predetermined mathematical function to generate the authentication response comprises incrementing the random number by one to generate the authentication response. In some implementations, industrial device 430 could perform some other predetermined mathematical operation on the random number in order to generate the authentication response. Once the response is generated, industrial device 430 then encrypts the authentication response using the device private key, and transmits the encrypted authentication response back to computing system 401.

Upon receipt of the authentication response, computing system 401 decrypts the authentication response using the public key of industrial device 430 obtained from the security certificate, and authenticates industrial device 430 based on the authentication response. For example, if the authentication challenge comprises a random number and the random number is modified in a predetermined and agreed-upon manner in the response, such as incrementing the number by one, then computing system 401 has successfully verified that industrial device 430 is authentic.

Advantageously, by utilizing a physical unclonable function response of industrial device 430 to generate the device private key, industrial device 430 can be authenticated without having to store this unique private encryption key in non-volatile memory of device 430. Further, when utilizing SRAM-based physical unclonable functions, the cost is kept low and provides a novel technique to backing vendor-signed identity certificates for anti-cloning and counterfeiting, which is beneficial since SRAM is generally present on a device regardless of security requirements. Moreover, by avoiding non-volatile memory storage of the device private key on industrial device 430, highly expensive secure processors and other secure hardware is unnecessary, and physical space requirements on the circuit board are consequently reduced, thereby providing significant cost savings and a smaller physical footprint. Finally, by eliminating the requirement for a persistent presence of a secret device private key in non-volatile memory, the risk of backdoor attacks on cryptographic systems are greatly reduced, thereby vastly increasing security and reducing the incidence of counterfeiting.

Now referring back to FIGS. 1 and 4, computing systems 101 and 401 individually comprise a processing system and communication transceiver. Computing systems 101 and 401 may also include other components such as a user interface, data storage system, and power supply. Computing systems 101 and 401 may each individually reside in a single device or may be distributed across multiple devices. Examples of computing systems 101 and 401 include mobile computing devices, such as cell phones, tablet computers, laptop computers, notebook computers, and gaming devices, as well as any other type of mobile computing devices and any combination or variation thereof. Examples of computing systems 101 and 401 also include desktop computers, server computers, and virtual machines, as well as any other type of computing system, variation, or combination thereof. In some implementations, computing systems 101 and 401 could individually comprise a mobile device capable of operating in a server-like fashion which, among other uses, could be utilized in a wireless mesh network.

Communication networks 120 and 420 could comprise multiple network elements such as routers, gateways, telecommunication switches, servers, processing systems, or other communication equipment and systems for providing communication and data services. In some examples, communication networks 120 and 420 could comprise wireless communication nodes, telephony switches, Internet routers, network gateways, computer systems, communication links, or some other type of communication equipment, including combinations thereof. Communication networks 120 and 420 may also comprise optical networks, packet networks, cellular networks, wireless mesh networks (WMN), local area networks (LAN), metropolitan area networks (MAN), wide area networks (WAN), or other network topologies, equipment, or systems, including combinations thereof. Communication networks 120 and 420 may be configured to communicate over metallic, wireless, or optical links. Communication networks 120 and 420 may be configured to use Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, communication networks 120 and 420 could include further access nodes and associated equipment for providing communication services to several computer systems across a large geographic region.

Industrial devices 130 and 430 generally comprise a processing system and communication transceiver, although some industrial devices 130 and 430 may not comprise such elements in some examples, such as data sensors and other more simplistic devices. Industrial devices 130 and 430 may each individually reside in a single device or may be distributed across multiple devices. Industrial devices 130 and 430 may each be a discrete system or may be integrated within other systems, including other systems within a communication system, an industrial automation environment, an automation control system, or any other system. Industrial devices 130 and 430 could comprise industrial controllers, overload protectors, motion drives, motors, energy monitoring equipment, input/output (I/O) modules, lighting controls, motion controls, motor controls, operator interfaces, power supplies, push buttons and signaling devices, safety products, communication devices, sensors, switches, data transmitters, HMI hardware systems, and any other industrial automation equipment. In examples where industrial devices 130 and 430 comprise industrial controllers, industrial devices 130 and 430 could comprise automation controllers, programmable logic controllers (PLCs), programmable automation controllers (PACs), or any other controllers used in automation control. In some implementations, a PLC, PAC, and/or specific modules within a PLC rack could provide some or all of the functionality described herein for industrial devices 130 and 430. In some examples, industrial devices 130 and 430 could individually comprise a ControlLogix® control system provided by Rockwell Automation, Inc.

Turning now to FIG. 6, a block diagram that illustrates an industrial automation environment 600 in an exemplary implementation is shown. Industrial automation environment 600 provides an example of an industrial automation environment that may be utilized to implement the authentication processes disclosed herein, but other environments could also be used. Industrial automation environment 600 includes computing system 610, machine system 620, industrial controller 625, database system 630, and application integration platform 635. Computing system 610 provides an example of computing systems 101 and 301, although systems 101 and 301 could use alternative configurations. Industrial controller 625 provides an example of industrial devices 130 and 330, although devices 130 and 330 could use alterative configurations. Machine system 620 and controller 625 are in communication over a communication link, controller 625 and database system 630 communicate over a communication link, database system 630 and application integration platform 635 communicate over a communication link, and application integration platform 635 and computing system 610 are in communication over a communication link. Note that there would typically be many more machine systems in most industrial automation environments, but the number of machine systems shown in FIG. 6 has been restricted for clarity.

Industrial automation environment 600 comprises an industrial mining operation, automobile manufacturing factory, food processing plant, oil drilling operation, microprocessor fabrication facility, or some other type of industrial enterprise. Machine system 620 could comprise a sensor, drive, pump, filter, drill, motor, robot, fabrication machinery, mill, printer, or any other industrial automation equipment, including their associated control systems. A control system comprises, for example, industrial controller 625, which could include automation controllers, programmable logic controllers (PLCs), programmable automation controllers (PACs), or any other controllers used in automation control. Industrial controller 625 may include authentication process 500 in some examples, and when executed by industrial controller 625 in general, and by a processor in particular, authentication process 500 directs industrial controller 625 to operate as described herein for authentication process 500 or portions or variations thereof. Additionally, machine system 620 could comprise other industrial equipment, such as a brew kettle in a brewery, a reserve of coal or other resources, or any other element that may reside in an industrial automation environment 600. Machine system 620 may include authentication process 500 in some examples where machine system 620 comprises a processor, and when executed by machine system 620 in general, and the processor in particular, authentication process 500 directs computing system 610 to operate as described herein for authentication process 500 or portions or variations thereof.

Machine system 620 continually produces operational data over time. The operational data indicates the current status of machine system 620, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 620 and/or controller 625 is capable of transferring the operational data over a communication link to database system 630, application integration platform 635, and computing system 610, typically via a communication network. Database system 630 could comprise a disk, tape, integrated circuit, server, or some other memory device. Database system 630 may reside in a single device or may be distributed among multiple memory devices.

Application integration platform 635 comprises a processing system and a communication transceiver. Application integration platform 635 may also include other components such as a router, server, data storage system, and power supply. Application integration platform 635 may reside in a single device or may be distributed across multiple devices. Application integration platform 635 may be a discrete system or may be integrated within other systems, including other systems within industrial automation environment 600. In some examples, application integration platform 635 could comprise a FactoryTalk® VantagePoint server system provided by Rockwell Automation, Inc.

The communication links over which data is exchanged between machine system 620, industrial controller 625, database system 630, application integration platform 635, and communication interface 608 of computing system 610 could use metal, air, space, optical fiber such as glass or plastic, or some other material as the transport medium, including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, cellular networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 610 may be representative of any computing apparatus, system, or systems on which the authentication processes disclosed herein or variations thereof may be suitably implemented. Computing system 610 provides an example of a computing system that could be used as a either a server or a client device in some implementations, although such devices could have alternative configurations. Examples of computing system 610 include mobile computing devices, such as cell phones, tablet computers, laptop computers, notebook computers, and gaming devices, as well as any other type of mobile computing devices and any combination or variation thereof. Examples of computing system 610 also include desktop computers, server computers, and virtual machines, as well as any other type of computing system, variation, or combination thereof. In some implementations, computing system 610 could comprise a mobile device capable of operating in a server-like fashion which, among other uses, could be utilized in a wireless mesh network.

Computing system 610 includes processing system 601, storage system 603, software 605, communication interface 608, and user interface 609. Processing system 601 is operatively coupled with storage system 603, communication interface 608, and user interface 609. Processing system 601 loads and executes software 605 from storage system 603. Software 605 includes application 606 and operating system 607. Application 606 may include authentication process 500 in some examples. When executed by computing system 610 in general, and processing system 601 in particular, software 605 directs computing system 610 to operate as described herein for authentication process 500 or portions or variations thereof. In this example, user interface 609 includes display system 611, which itself may be part of a touch screen that also accepts user inputs via touches on its surface. Computing system 610 may optionally include additional devices, features, or functionality not discussed here for purposes of brevity.

Turning now to FIG. 7, a block diagram is shown that illustrates computing system 700 in an exemplary implementation. Computing system 700 provides an example of computing system 101, computing system 401, industrial device 130, industrial device 430, or any other computing system or device that may be used to execute authentication process 500 or variations thereof, although computing system 101, computing system 401, industrial device 130, and industrial device 430 could use alternative configurations. Computing system 700 includes processing system 701, storage system 703, software 705, communication interface 707, and user interface 709. User interface 709 comprises display system 708. Software 705 includes application 706 which itself includes authentication process 500. Authentication process 500 may optionally be implemented separately from application 706, as indicated by the dashed line in FIG. 7.

Computing system 700 may be representative of any computing apparatus, system, or systems on which application 706 and authentication process 500 or variations thereof may be suitably implemented. Examples of computing system 700 include mobile computing devices, such as cell phones, tablet computers, laptop computers, notebook computers, and gaming devices, as well as any other type of mobile computing devices and any combination or variation thereof. Note that the features and functionality of computing system 700 may apply as well to desktop computers, server computers, and virtual machines, as well as any other type of computing system, variation, or combination thereof.

Computing system 700 includes processing system 701, storage system 703, software 705, communication interface 707, and user interface 709. Processing system 701 is operatively coupled with storage system 703, communication interface 707, and user interface 709. Processing system 701 loads and executes software 705 from storage system 703. When executed by computing system 700 in general, and processing system 701 in particular, software 705 directs computing system 700 to operate as described herein for authentication process 500 or variations thereof. Computing system 700 may optionally include additional devices, features, or functionality not discussed herein for purposes of brevity.

Referring still to FIG. 7, processing system 701 may comprise a microprocessor and other circuitry that retrieves and executes software 705 from storage system 703. Processing system 701 may be implemented within a single processing device but may also be distributed across multiple processing devices or sub-systems that cooperate in executing program instructions. Examples of processing system 701 include general purpose central processing units, application specific processors, and logic devices, as well as any other type of processing device, combinations, or variations thereof.

Storage system 703 may comprise any computer-readable storage media capable of storing software 705 and readable by processing system 701. Storage system 703 may include volatile and nonvolatile, removable and non-removable media implemented in any method or technology for storage of information, such as computer readable instructions, data structures, program modules, or other data. Storage system 703 may be implemented as a single storage device but may also be implemented across multiple storage devices or sub-systems co-located or distributed relative to each other. Storage system 703 may comprise additional elements, such as a controller, capable of communicating with processing system 701. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, processing system 701 may load and execute portions of software 705, such as authentication process 500, to operate as described herein for authentication process 500 or variations thereof. Software 705 may be implemented in program instructions and among other functions may, when executed by computing system 700 in general or processing system 701 in particular, direct computing system 700 or processing system 701 to extract a physical unclonable function response of an industrial device. Software 705 may direct computing system 700 or processing system 701 to, in response to receiving a request for a security certificate from a system, transmit the security certificate signed by a certificate authority that includes a device public key associated with the industrial device, wherein the system validates the security certificate, encrypts an authentication challenge for the industrial device using the device public key, and transmits the authentication challenge for delivery to the industrial device. In addition, software 705 may direct computing system 700 or processing system 701 to, in response to receiving the authentication challenge, generate a device private key using the physical unclonable function response of the industrial device and decrypt the authentication challenge using the device private key. Software 705 may further direct computing system 700 or processing system 701 to generate an authentication response based on the authentication challenge, encrypt the authentication response using the device private key, and transmit the authentication response for delivery to the system, wherein the system decrypts the authentication response using the device public key and authenticates the industrial device based on the authentication response.

In some implementations, software 705 could comprise an extraction component configured to extract a physical unclonable function response of the industrial device. Software 705 could further comprise a certificate transmission component configured to, in response to receiving a request for a security certificate from a system, transmit the security certificate signed by a certificate authority that includes a device public key associated with the industrial device, wherein the system validates the security certificate, encrypts an authentication challenge for the industrial device using the device public key, and transmits the authentication challenge for delivery to the industrial device. Software 705 may further comprise a decryption component configured to, in response to receiving the authentication challenge, generate a device private key using the physical unclonable function response of the industrial device and decrypt the authentication challenge using the device private key. Software 705 could further comprise an authentication component configured to generate an authentication response based on the authentication challenge, encrypt the authentication response using the device private key, and transmit the authentication response for delivery to the system, wherein the system decrypts the authentication response using the device public key and authenticates the industrial device based on the authentication response.

Software 705 may include additional processes, programs, or components, such as operating system software or other application software. Examples of operating systems include Windows®, iOS®, and Android®, as well as any other suitable operating system. Software 705 may also comprise firmware or some other form of machine-readable processing instructions executable by processing system 701.

In general, software 705 may, when loaded into processing system 701 and executed, transform computing system 700 overall from a general-purpose computing system into a special-purpose computing system customized for authenticating industrial devices associated with an industrial process in an industrial automation environment as described herein for each implementation. For example, encoding software 705 on storage system 703 may transform the physical structure of storage system 703. The specific transformation of the physical structure may depend on various factors in different implementations of this description. Examples of such factors may include, but are not limited to the technology used to implement the storage media of storage system 703 and whether the computer-storage media are characterized as primary or secondary storage.

In some examples, if the computer-storage media are implemented as semiconductor-based memory, software 705 may transform the physical state of the semiconductor memory when the program is encoded therein. For example, software 705 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 700 is generally intended to represent a computing system with which software 705 is deployed and executed in order to implement application 706 and/or authentication process 500 (and variations thereof). However, computing system 700 may also represent any computing system on which software 705 may be staged and from where software 705 may be distributed, transported, downloaded, or otherwise provided to yet another computing system for deployment and execution, or yet additional distribution. For example, computing system 700 could be configured to deploy software 705 over the internet to one or more client computing systems for execution thereon, such as in a cloud-based deployment scenario.

Communication interface 707 may include communication connections and devices that allow for communication between computing system 700 and other computing systems (not shown) or services, over a communication network 711 or collection of networks. In some implementations, communication interface 707 receives dynamic data 721 over communication network 711. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 709 may include a voice input device, a touch input device for receiving a gesture from a user, a motion input device for detecting non-touch gestures and other motions by a user, and other comparable input devices and associated processing elements capable of receiving user input from a user. Output devices such as display system 708, speakers, haptic devices, and other types of output devices may also be included in user interface 709. The aforementioned user input devices are well known in the art and need not be discussed at length here. User interface 709 may also include associated user interface software executable by processing system 701 in support of the various user input and output devices discussed above. Separately or in conjunction with each other and other hardware and software elements, the user interface software and devices may provide a graphical user interface, a natural user interface, or any other kind of user interface. User interface 709 may be omitted in some examples.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method for authenticating industrial devices associated with an industrial process in an industrial automation environment, the method comprising:

extracting, by an industrial device comprising a processor, a physical unclonable function response of the industrial device, wherein the industrial device is associated with the industrial process in the industrial automation environment;

in response to receiving a request for a security certificate from a system, transmitting, by the industrial device, the security certificate signed by a certificate authority that includes a device public key associated with the industrial device, wherein the system validates the security certificate, encrypts an authentication challenge comprising a random number for the industrial device using the device public key, and transmits the authentication challenge for delivery to the industrial device;

in response to receiving the authentication challenge, generating, by the industrial device, a device private key using the physical unclonable function response of the industrial device and decrypting the authentication challenge using the device private key;

generating, by the industrial device, an authentication response by applying a predetermined mathematical function to the random number, wherein the predetermined mathematical function is agreed-upon by the industrial device and the system and the predetermined mathematical function is not associated with the device public key; and encrypting, by the industrial device, the authentication response using the device private key, and transmitting the authentication response for delivery to the system, wherein the system decrypts the authentication response using the device public key and authenticates the industrial device based on the authentication response.

2. The method of claim 1 wherein the industrial device is provisioned with the security certificate that includes the device public key that is paired with the device private key that may be generated by the industrial device using the physical unclonable function response.

3. The method of claim 1 wherein generating the device private key using the physical unclonable function response comprises generating the device private key using a static random-access memory-based physical unclonable function response.

4. The method of claim 1 wherein extracting the physical unclonable function response of the industrial device comprises storing the physical unclonable function response in a secure portion of volatile memory of the industrial device that is reserved for access by privileged code.

5. The method of claim 1, wherein the security certificate comprises identity information that uniquely identifies the industrial device.

6. The method of claim 1 wherein the predetermined mathematical function comprises incrementing the random number by one.

7. The method of claim 1 wherein the security certificate is signed by the certificate authority using an authority private key associated with the certificate authority, and wherein the system validates the security certificate using an authority public key paired with the authority private key associated with the certificate authority, and extracts the device public key from the security certificate upon successfully validating the security certificate.

8. An industrial device associated with an industrial process in an industrial automation environment, the industrial device comprising:
a memory that stores executable components; and
a processor, operatively coupled to the memory, that executes the executable components, the executable components comprising:
an extraction component configured to extract a physical unclonable function response of the industrial device, wherein the industrial device is associated with the industrial process in the industrial automation environment;
a certificate transmission component configured to, in response to receiving a request for a security certificate from a system, transmit the security certificate signed by a certificate authority that includes a device public key associated with the industrial device, wherein the system validates the security certificate, encrypts an authentication challenge comprising a random number for the industrial device using the device public key, and transmits the authentication challenge for delivery to the industrial device;
a decryption component configured to, in response to receiving the authentication challenge, generate a device private key using the physical unclonable function response of the industrial device and decrypt the authentication challenge using the device private key; and
an authentication component configured to:
generate an authentication response by applying a predetermined mathematical function to the random number, wherein the predetermined mathematical function is agreed-upon by the industrial device and the system and the predetermined mathematical function is not associated with the device public key, and
encrypt the authentication response using the device private key, and transmit the authentication response for delivery to the system, wherein the system decrypts the authentication response using the device public key and authenticates the industrial device based on the authentication response.

9. The industrial device of claim 8 wherein the industrial device is provisioned with the security certificate that includes the device public key that is paired with the device private key that may be generated by the industrial device using the physical unclonable function response.

10. The industrial device of claim 8 wherein the decryption component configured to generate the device private key using the physical unclonable function response comprises the decryption component configured to generate the device private key using a static random-access memory-based physical unclonable function response.

11. The industrial device of claim 8 wherein the extraction component configured to extract the physical unclonable function response of the industrial device comprises the extraction component configured to store the physical unclonable function response in a secure portion of volatile memory of the industrial device that is reserved for access by privileged code.

12. The industrial device of claim 8 wherein the security certificate comprises identity information that uniquely identifies the industrial device.

13. The industrial device of claim 8 wherein the predetermined mathematical function comprises incrementing the random number by one.

14. The industrial device of claim 8 wherein the security certificate is signed by the certificate authority using an authority private key associated with the certificate authority, and wherein the system validates the security certificate using an authority public key paired with the authority private key associated with the certificate authority, and extracts the device public key from the security certificate upon successfully validating the security certificate.

15. A non-transitory computer-readable medium having stored thereon instructions that, in response to execution, cause an industrial device comprising a processor to perform operations, the operations comprising:
extracting a physical unclonable function response of the industrial device, wherein the industrial device is associated with an industrial process in an industrial automation environment;
in response to receiving a request for a security certificate from a system, transmitting the security certificate signed by a certificate authority that includes a device public key associated with the industrial device, wherein the system validates the security certificate, encrypts an authentication challenge comprising a random number for the industrial device using the device public key, and transmits the authentication challenge for delivery to the industrial device;

in response to receiving the authentication challenge, generating a device private key using the physical unclonable function response of the industrial device and decrypting the authentication challenge using the device private key;

generating an authentication response by applying a predetermined mathematical function to the random number, wherein the predetermined mathematical function is agreed-upon by the industrial device and the system and the predetermined mathematical function is not associated with the device public key; and encrypting the authentication response using the device private key, and transmitting the authentication response for delivery to the system, wherein the system decrypts the authentication response using the device public key and authenticates the industrial device based on the authentication response.

16. The non-transitory computer-readable medium of claim 15 wherein the industrial device is provisioned with the security certificate that includes the device public key that is paired with the device private key that may be generated by the industrial device using the physical unclonable function response.

17. The non-transitory computer-readable medium of claim 15 wherein generating the device private key using the physical unclonable function response comprises generating the device private key using a static random-access memory-based physical unclonable function response.

18. The non-transitory computer-readable medium of claim 15 wherein extracting the physical unclonable function response of the industrial device comprises storing the physical unclonable function response in a secure portion of volatile memory of the industrial device that is reserved for access by privileged code.

19. The non-transitory computer-readable medium of claim 15 wherein the security certificate is signed by the certificate authority using an authority private key associated with the certificate authority, and wherein the system validates the security certificate using an authority public key paired with the authority private key associated with the certificate authority, and extracts the device public key from the security certificate upon successfully validating the security certificate.

20. The non-transitory computer-readable medium of claim 15 wherein processing the random number of the authentication challenge using the predetermined mathematical function to generate the authentication response comprises incrementing the random number by one to generate the authentication response.

\* \* \* \* \*